United States Patent Office 3,439,069
Patented Apr. 15, 1969

3,439,069
MONOPHOSPHORIC ACID ESTERS OF HALOGEN CONTAINING 2,2'-METHYLENEDIPHENOLS
Samuel Van Der Meer, Amstelveen, and Hendrik Pouwels, Amsterdam, Netherlands, assignors to ACF (Amsterdam Chemie Farmacie) N.V., Amsterdam, Netherlands, a limited-liability company of the Netherlands
No Drawing. Filed July 9, 1965, Ser. No. 470,885
Claims priority, application Netherlands, July 11, 1964, 6407946
Int. Cl. C07f 9/08; A61k 27/00
U.S. Cl. 260—953      3 Claims

ABSTRACT OF THE DISCLOSURE

The monophosphoric acid esters of compounds having the formula

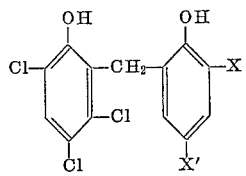

in which X and X' are different halogens selected from the group consisting of chlorine, bromine and iodine, are particularly suited for the treatment of fascioliasis, liver rot or liver-fluke infections.

---

The present invention relates to halogen containing 2,2'-methylenediphenols and to methods of treatment of fascioliasis with such compounds.

It has been found that compounds according to the formula:

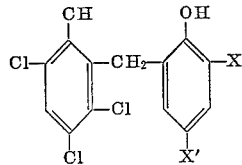

and their monophosphoric acid esters, in which formula X and X' represent chlorine, bromine or iodine, with the exception of both X and X' being chlorine, are very useful in combating fascioliasis.

Fascioliasis, liver rot, or liver-fluke infection is a disease that particularly affects sheep and cattle, but which may also attack other warm-blooded animals and even man.

The disease is caused by the liver-fluke (*Fasciola hepatica*), a parasite thriving in the liver and biliary ducts of the infected animals and causing ravages of such organs by which their normal functioning is disturbed. The aftereffect of the disease is a more or less large decline in the general condition of the animals which may even cause their death.

The compounds according to the invention, and especially those in which X and X' represent different halogens selected from the group consisting of chlorine, bromine and iodine, have been found to possess a notable activity against the liver-fluke at comparatively low dosages. Moreover their toxicity is much lower than that of other compounds previously used in combating fascioliasis, as appears from the following table:

Table

Oral toxicity in mice of some compounds according to the invention in comparison with hexachlorophene (an agent recommended recently to be active against fascioliasis). The $LD_{50}$ is that single dose which is lethal to 50% of the test animals.

| Administered compound: | $LD_{50}$ in mg./kg. |
|---|---|
| I (X=I,X'=Cl) | 352 |
| II (X=I,X'=Br) | >640 |
| III (X=I,X'=I) | 500 |
| IV (X=Br,X'=Br) | 150 |
| V (X=Br,X'=Cl) | 230 |
| VI (X=Cl,X'=Br) | 239 |
| Hexachlorophene | 76 |
| VII (X=Cl,X'=Cl) | 80 |

Although Compound IV in the above table has been mentioned by Jacek Arct c.s., Przemysl Chem. 41, 582 (1962), see also Chem. Abstr. 59, 608d, but it is doubtful that the compound mentioned in that publication has the structure of Compound IV. These authors have stated that the identified compound has a melting point of 155–157° C., whereas Compound IV melts at 175–176.5° C. to prove the right structure, Compound IV has been synthesized in two different ways described in the following Example 1 and Example 4, respectively.

The other compounds according to the invention have never been described specifically in the literature. However, they do fall within the scope of the general formula mentioned in British Patent No. 760,342. In this British patent a method is given to prepare compounds of the formula:

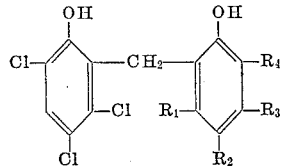

in which $R_1$, $R_2$, $R_3$ and $R_4$ stand for hydrogen or for halogen.

Although this formula embraces a great number of compounds, only four of them, in which the halogen substituents merely represent chlorine, have been explicitly described in the examples. One of these examples is Compound VII of the above table, which is seen to have a toxicity similar to that of hexachlorophene. Hexachlorophene is another of the specifically disclosed examples of the British patent. Further, neither the above mentioned publication nor the British patent suggests the superior effectiveness of the compounds herein disclosed for the treatment of fascioliasis.

The compounds according to this invention may be prepared by methods known per se for analogous compounds. A very suitable method is that described in British Patent No. 760,342, mentioned before. According to this method 3,5,6-trichlorosaligenin is condensed with a phenol (of course it is possible to start from the 3,5,6-trichlorosaligenin as well as from the saligenin corresponding to the right hand part of the molecule of the compound to be prepared).

It is also possible to perform this reaction in a two-step process, comprising first the esterification of the halogenated saligenin, and second the condensation of the resulting saligenin α-monoester with a phenol. This method has been described in detail in the U.S. Patent No. 2,733,273. In the above described condensation reactions, the starting phenols may be substituted in such a way that the compounds of the invention are formed directly. On the other hand, it is also possible to carry out the condensation with a phenol devoid of X or both X and X', and to introduce these substituents afterwards in a separate reaction step.

The new monophosphoric acid esters according to the invention, in general, have anti-parasitic properties that are similar to those of their parent compounds. Moreover, (and in contrast to the parent compounds) it is possible to prepare neutral aqueous solutions of the monophosphoric acid esters. This property has advantages in the administration of the compounds, especially in sheep. The monophosphoric acid esters may be prepared in a known manner. A simple method exists in treating the parent compound with phosphoryl chloride, converting the cyclic phosphorochloridate obtained into the corresponding cyclic phosphate, and hydrolyzing the latter compound to the monophosphoric acid ester according to the invention (compare the method described by M. H. Maguire et al., J. Chem. Soc. 1953, 1479).

Another object of the invention is to procure new compositions for combating fascioliasis. These compositions may be prepared by mixing the essential active ingredient with a carrier. Usual carriers in such preparations are talc, magnesium stearate, amylum, lactose, etc.

Particularly useful are tablets containing the monophosphoric acid esters together with approximately equivalent amounts of sodium hydrogen carbonate.

In the treatment of animals suffering from fascioliasis, therapeutically effective amounts of the halogen containing 2,2'-methylenediphenols defined above are administered, either orally or otherwise.

The preparation of compounds according to this invention and of compositions containing the same, and the use of such compositions in the treatment of fascioliasis are more specifically disclosed in the following illustrative examples.

Example 1

To a mixture of 68.3 grams of 3,5,6-trichlorosaligenin 75.6 grams of 2,4-dibromophenol and 35 ml. of water there are slowly added, at a temperature of 70° C. and with stirring, 100 ml. of concentrated sulfuric acid. After the addition, stirring is continued for 30 minutes at 90–100° C., whereupon the reaction mixture is allowed to cool. The precipitate is filtered and washed with benzene. The 4',6' - dibromo-3,4,6-trichloro-2,2'methylenediphenol obtained melts after purification at 175–176.6° C. Yield: 56%.

Example 2

In a manner similar to that described in Example 1, however, starting from 2,4-diiodophenol instead of the corresponding dibromo derivative, 3,4,6-trichloro-4',6'-diodo - 2,2'-methylenediphenol is obtained. Melting point 203–205° C. Yield: 22%.

Example 3

To a boiling solution of 10.15 grams of 3,4,4',6-tetrachloro-2,2'-methylenediphenol (prepared according to Example 6) in 60 ml. of glacial acetic acid, 4.8 grams of bromine in 10 ml. of glacial acetic acid are added. The reaction mixture is allowed to cool and the precipitate, consisting of 6' - bromo-3,4,4',6-tetrachloro-2,2'-methylenediphenol, is filtered. Melting point 169–170° C. (from acetic acid) and 166–167.5° C. (from benzene). Yield: 80%.

Example 4

In a manner similar to that described in Example 3, however, starting from 3,4,6-trichloro-2,2'-methylenediphenol and using twice as much bromine, 4',6'-dibromo-3,4,6-trichloro-2,2'-methylenediphenol is obtained. The reaction product is identical to the compound obtained according to Example 1. Yield: 88%.

Example 5

To a solution of 15.2 grams of 3,4,6-trichloro-2,2'-methylenediphenol in 200 ml. of 1 N aqueous sodium hydroxide is added, with stirring at room temperature, a solution of 25.4 grams of iodine and 50 grams of potassium iodide in 100 ml. of water. After acidifying the solution, the precipitate formed is filtered and recrystallized from benzene. The reaction products, 3,4,6-trichloro-4',6'-diiodo-2,2'-methylenediphenol is identical to the compound obtained according to Example 2. Yield: 75%.

Example 6

To a solution of 67.6 grams of 3,4,4',6-tetrachloro-2'2'-methylenediphenol (which was obtained from 3,5,6-trichlorosaligenin and p-chlorophenol by a method analogous to the method described in Example 1) in 800 ml. 1 N aqueous sodium hydroxide are added, with stirring at room temperature, a solution of 50.8 grams of iodine and 100 grams of potassium iodide in 200 ml. of water. The reaction mixture is acidified and the precipitate formed filtered, and recrystallized from glacial acetic acid. The 3,4,4',6 - tetrachloro - 6'-iodo-2,2'-methylenediphenol obtained melts at 188–189° C. Yield: 69%.

Example 7

In a manner similar to that described in Example 6, however, starting from 4' - bromo - 3,4,6-trichloro-2,2'-methylenediphenol (which was obtained, in turn, from 3,5,6-trichlorosaligenin and p-bromophenol in a way analogous to that described in Example 1), 4'-bromo-3,4,6-trichloro-6'-iodo-2,2'-methylenediphenol, melting at 192–193° C. is obtained. Yield: 78%.

Example 8

To a solution of 76.5 grams of 4'-bromo-3,4,6-trichloro-2,2'-methylenediphenol in 1250 ml. of glacial acetic acid are gradually added, with stirring at about 100° C., 40 ml. of sulphuryl chloride. After the addition has been completed, stirring is continued for six hours. Then, the reaction mixture is poured into 2 liters of water. The precipitate which appears is dissolved in aqueous sodium hydroxide, the solution filtered and acidified. The crude product is recrystallized from 300 ml. of benzene yielding 88% of 4' - bromo-3,4,6,6'-tetrachloro-2,2'-methylenediphenol, melting at 155.5–156.5° C.

Example 9

A mixture of 104.25 grams of 6'-bromo-3,4,4',6-tetrachloro-2,2'-methylenediphenol, 230 ml. of phosphoryl chloride and 2.3 ml. of pyridine is boiled under reflux for four hours, after which the excess of phosphoryl chloride is removed under reduced pressure. The residue is mixed with 1875 ml. of aqueous 1 N sodium hydroxide and again boiled under reflux for four hours. The reaction mixture is allowed to cool, acidified and extracted with ethyl acetate. After evaporation of the solvent, the crude monophosphoric acid ester of 6'-bromo-3,4,4',6-tetrachloro-2,2'-methylenediphenol is obtained. The product may be purified by dissolving the same in ethyl acetate, extracting this solution with a solution of 21 grams of sodium hydrogen carbonate in 500 ml. of water, acidifying the aqueous layer and extracting the same again with ethyl acetate. After evaporation of the solvent the above mentioned product is obtained as a white crystalline solid. Yield: 85%. The purity may be controlled by potentiometric titration.

In a similar way other monophosphoric acid esters according to the invention may be obtained.

Example 10

41.7 grams of 6'-bromo-3,4,4',6-tetrachloro-2,2'-methylenediphenol is dissolved in 200 ml. aqueous 1 N sodium hydroxide. The solution obtained may be used in treating fascioliasis.

Example 11

To 10 ml. of Mulgofen E L–719 (a mixture of polyethylene ethers of hydroxy fatty acids) are added, with stirring and heating on a steam bath, 1.8 grams of 4'-bromo - 3,4,6 - trichloro - 6' - iodo - 2,2' - methylenediphenol. Stirring is continued until the solid is dissolved, whereupon the mixture is made up with water to 80 ml. The solution obtained may be used in combating fascioliasis.

Example 12

A mixture of 1000 grams of 3,4,4',6-tetrachloro-6'-iodo-2,2'-methylenediphenol, 2580 grams of lactose and 120 grams of polyvinylpyrrolidone is granulated, whereupon 400 grams of sodium hydrogen carbonate, 140 grams of talc, 70 grams of sodium stearate and 190 grams of amylum are added. The whole mixture is worked up in a known manner into 1000 capsule-shaped tablets (oblong tablets) of 4.5 grams each. These tablets may be used in combating fascioliasis in animals.

Example 13

A sheep, the faeces of which contain 520 liver-fluke eggs per gram, is treated with a single dose of 10 mg./kg. of 4'-bromo-3,4,6-trichloro-6'-iodo-2,2'-methylenediphenol in the form of a composition prepared according to Example 11, and which is administered orally.

One and two weeks after treatment the faeces of the sheep are free from eggs of the parasite.

Example 14

A sheep, the faeces of which contain 90 liver-fluke eggs per gram, is treated with a single dose of 10 mg./kg. of 3,4,6-trichloro-4',6'-diiodo-2,2'-methylenediphenol in the form of a composition prepared according to Example 10, and which is administered orally.

One and two weeks after treatment the faeces of the sheep are free from eggs of the parasite.

Example 15

A group of twelve sheep, the faeces of which contain on an average 207 liver-fluke eggs per gram, is treated with 3,4,4',6-tetrachloro-6'-iodo-2,2'-methylenediphenol in the form of one tablet prepared according to Example 12, and which is administered orally.

One week after treatment the egg-excretion of the whole group is reduced to an average of 22 per gram faeces.

We claim:
1. A compound of the group consisting of the monophosphoric acid esters of compounds having the formula:

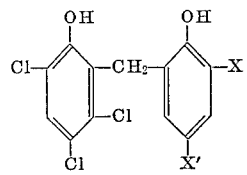

in which X and X' are different halogens selected from the group consisting of chlorine, bromine and iodine.

2. The monophosphoric acid ester of 6'-bromo-3,4,4',6-tetrachloro-2,2'-methylene-diphenol.

3. The monophosphoric acid ester of 4'-bromo-3,4,6,6'-tetrachloro-2,2'-methylene-diphenol.

References Cited

UNITED STATES PATENTS 2,544,826  3/1951  Craige.

OTHER REFERENCES

Arct, "Chemical Abstracts," vol. 59 (1963), p. 608d.

CHARLES B. PARKER, Primary Examiner.

A. H. SUTTO, Assistant Examiner.

U.S. Cl. X.R.

260—619, 936, 974, 983; 424—217